United States Patent
Buswell et al.

(10) Patent No.: US 8,743,432 B2
(45) Date of Patent: Jun. 3, 2014

(54) USB DEVICE WITH PICTBRIDGE CAPABILITY

(75) Inventors: Kenneth L. Buswell, Granite Bay, CA (US); David G. Hille, Brush Prarie, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 75 days.

(21) Appl. No.: 11/244,092

(22) Filed: Oct. 5, 2005

(65) Prior Publication Data

US 2006/0031609 A1 Feb. 9, 2006

Related U.S. Application Data

(63) Continuation-in-part of application No. 10/774,030, filed on Feb. 5, 2004, now abandoned.

(51) Int. Cl.
*H04N 1/00* (2006.01)

(52) U.S. Cl.
USPC .......................... 358/504; 358/1.15

(58) Field of Classification Search
CPC ............... H04N 1/00002; H04N 2201/0036; H04N 21/44231; H04N 21/4367; G06F 3/128; G06F 2213/0042; G06F 3/1236
USPC ............... 358/504, 406, 1.15; 399/11
See application file for complete search history.

(56) References Cited

U.S. PATENT DOCUMENTS

| | | | |
|---|---|---|---|
| 5,768,495 A * | 6/1998 | Campbell et al. | 714/25 |
| 5,870,458 A | 2/1999 | Pappas et al. | |
| 6,400,462 B1 * | 6/2002 | Hille | 358/1.14 |
| 6,667,972 B1 | 12/2003 | Foltan et al. | |
| 6,917,594 B2 | 7/2005 | Feuerstraeter et al. | |
| 7,079,970 B2 * | 7/2006 | Nicodem et al. | 702/108 |
| 2002/0133649 A1 * | 9/2002 | Chu | 710/62 |
| 2003/0223486 A1 * | 12/2003 | Hsu | 375/224 |
| 2004/0030809 A1 * | 2/2004 | Lozano et al. | 710/8 |
| 2005/0060447 A1 | 3/2005 | Tanaka | |
| 2005/0253930 A1 * | 11/2005 | Endo et al. | 348/207.1 |
| 2005/0268175 A1 * | 12/2005 | Park | 714/43 |
| 2006/0047465 A1 * | 3/2006 | Ousley et al. | 702/127 |

OTHER PUBLICATIONS

CIPA White Paper of CIPA DC-001-2003; Digital Photo Solutions for Imaging Devices; Camera & Imaging Products Association; Feb. 3, 2003.*

925 VST Powerful Next Generation Handheld Service Tester; Product Literature available from Sage Instruments; www.sageinst.com.

Renshou Dai, "Information on Sage's Fax Emulator"; Product Information on Sage products available from Sage Instruments; www.sageinst.com; Jun. 6, 2002.

FaxProbe 4.01, Monitor, Originate, or Answer Fax Transmissions, 1st Modem Accessible Facsimile Tester; Product Information on Genoa Technology product, http:///www.gentech.com.

(Continued)

*Primary Examiner* — Marivelisse Santiago Cordero
*Assistant Examiner* — Kent Yip

(57) ABSTRACT

A diagnostic tool includes a USB device connector and a processor. The processor allows a user to select a type of device under test that is to be tested. The processor has the ability to test PictBridge functionality of a host USB. The types of device under test selectable by a user include devices under test that do not have ability to communicate using PictBridge.

18 Claims, 12 Drawing Sheets

(56) References Cited

OTHER PUBLICATIONS

V.34 Fax Testing Tool; Product Literature from Quality Logic Inc., http://www.qualitylogic.com/genoa_test_tools/fax/v.34.html; 2003.

FaxLab; Product Literature from Quality Logic, Inc. http://www.qualitylogic.com/genoa_test_tools/fax/faxlab.html; 2003.

CIPA White Paper of CIPA CD-001-2003; Digital Photo Solutions for Imaging Devices; Published by Camera & Imaging Products Association; Feb. 3, 2003.

* cited by examiner

USB DEVICE WITH PICTBRIDGE CAPABILITY

CROSS REFERENCE TO RELATED APPLICATION

This application is a continuation-in-part of application Ser. No. 10/774,030, filed Feb. 5, 2005.

BACKGROUND

Stores receive millions of dollars of returns of products. Sometimes the returns result from defective products. Other times the returns result from customer dissatisfaction with a product despite no product defect. If a product is defective, the product is generally returned to the manufacturer. If the product is not defective, it is advantageous to both the stores and the manufacturer if the product can be resold without returning the product to the manufacturer.

Before reselling a returned product, it is desirable that a store be able to test the product to assure proper operation. For example, Hewlett-Packard Company provides a diagnostic tool to stores that allow stores to perform tests to aid in the determination of whether returned printers are faulty.

The Camera & Imaging Products Association (CIPA) Pict-Bridge (CIPA DC-001) standard provides a direct connect solution for image input devices and output devices by standardizing the application services for these devices.

SUMMARY OF THE INVENTION

In accordance with an embodiment of the present invention, a diagnostic tool includes a USB device connector and a processor. The processor allows a user to select a type of device under test that is to be tested. The processor has the ability to test PictBridge functionality of a host USB. The types of device under test selectable by a user include devices under test that do not have ability to communicate using PictBridge.

DESCRIPTION OF THE EMBODIMENT

Figure 1:
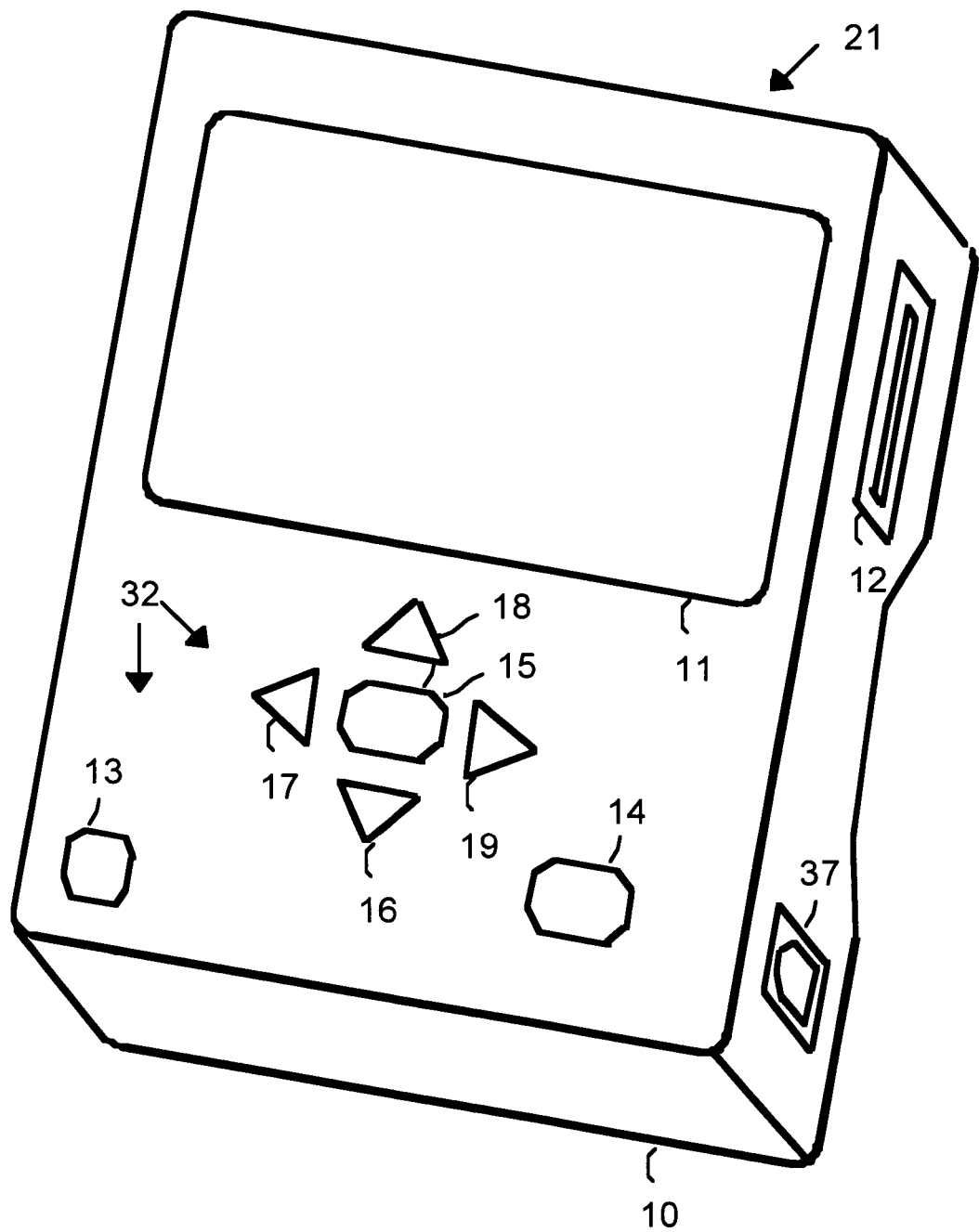
FIG. 1 and FIG. 2 are simplified diagrams of a handheld diagnostic tool that performs testing of a PictBridge connection in accordance with an embodiment of the present invention.

FIG. 1 shows a simplified diagram of a diagnostic tool 10 that is used to test a device under test (DUT). The diagnostic tool 10 includes a display 11, a USB device connector 37, and another connector 12. Diagnostic tool 10 also can also include, for example, additional connectors and can include the ability to perform wireless communication. For example, display 11 is a liquid crystal display (LCD). A keypad 32 for diagnostic tool 10 includes, for example, a power key 13, a menu key 14, a selection key 15, a direction key 16, a direction key 17, a direction key 18 and a direction key 19.

Figure 2:
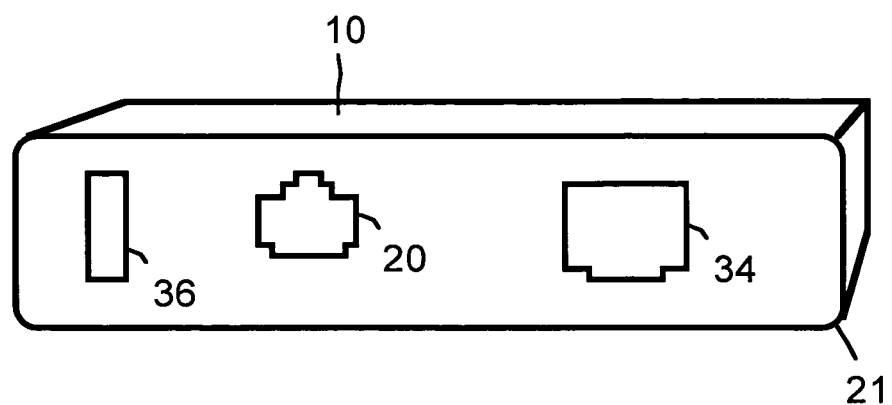

A top region 21 of diagnostic tool 10 contains additional connectors. For example, as shown in FIG. 2, top region 21 of diagnostic tool 10 contains a USB host connector 36, an RJ-45 Ethernet connector 34 and a telephone line connector 20. The telephone line connector may be for analog ISDN, digital proprietary protocols or IP protocol transmissions.

Figure 3:
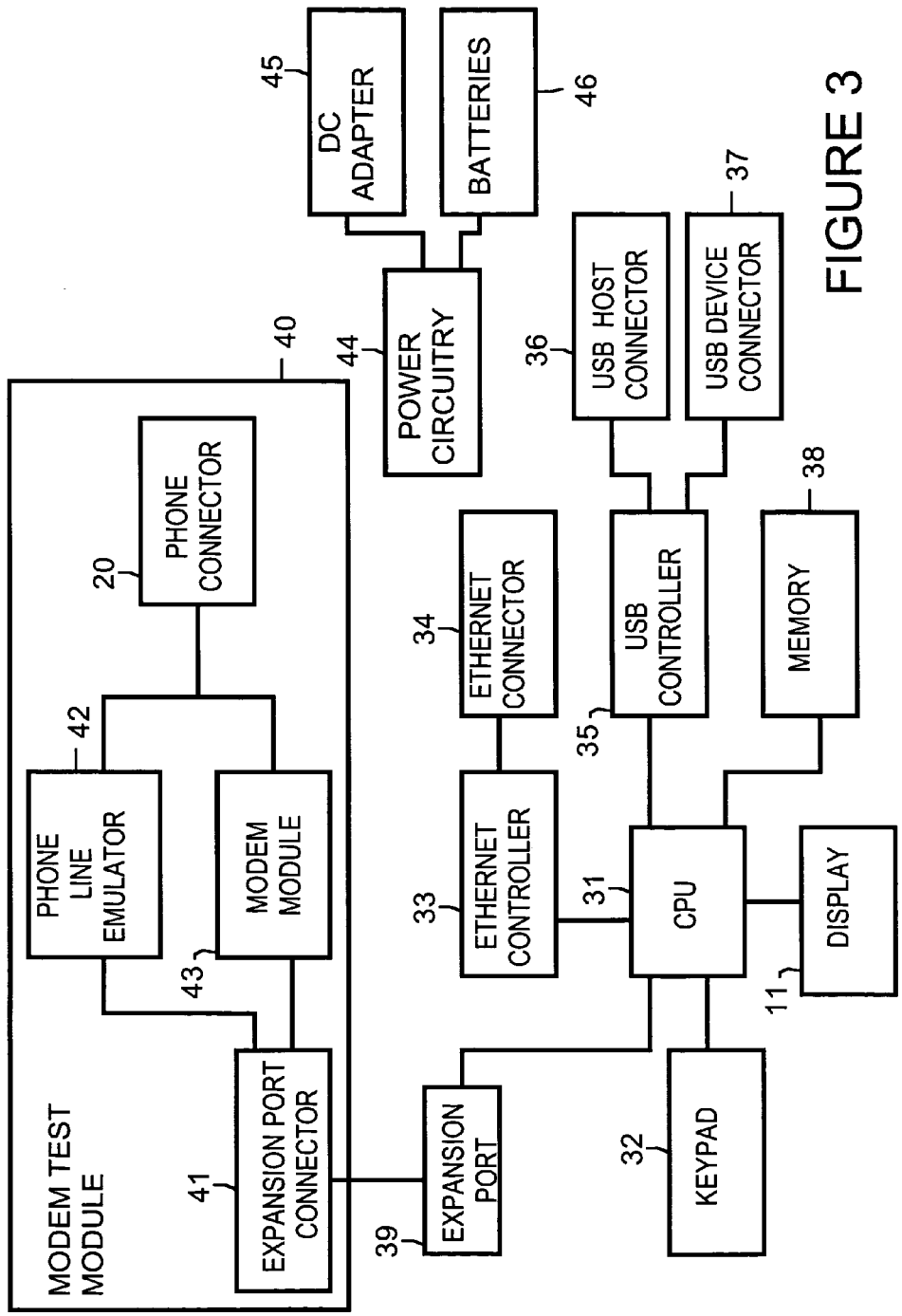
FIG. 3 is a simplified block diagram of the handheld diagnostic tool shown in FIG. 1 in accordance with an embodiment of the present invention.

FIG. 3 shows a simplified block diagram for diagnostic tool 10. A central processing unit (CPU) 31 interfaces with keypad 32, an Ethernet controller 33, a universal serial bus (USB) controller 35, memory 38, display 11 and an expansion port 39. Ethernet controller 33 controls communication over Ethernet connector 34. USB controller 35 controls communication over USB host connector 36 and USB device connector 37.

An expansion port connector 41 within a modem test module 40 is connected to an expansion port 39. Modem test module 40 also includes a phone line emulator 42, a modem module 43 and phone connector 20. Phone line emulator 42 provides emulation of a phone line including a disconnect message (an on-hook signal), a connection signal (an off-hook signal) and an alerting message (ring signal). Modem module 43 provides the capability to communicate with both a data modem and a fax modem.

The connection between expansion port 39 and expansion port connector 41 provides both power and control to phone line emulator 42 and modem module 43. Connector 20 is used to connect to a telephone connector of a device under test (DUT) that includes fax capability, includes data modem connectivity or includes both fax capability and data modem connectivity.

CPU 31 executes programming within memory 38 to control operation of diagnostic tool 10. A user can use keypad 32 to access and interact with menus displayed on display 11. Power circuitry 44 provides power to the components of diagnostic tool 10. Power is supplied to power circuitry 44, for example, by a DC adapter 45 or by batteries 46. For example, batteries 46 consist of four AA batteries. Power circuitry 44 generates, for example, a five-volt power signal and a 3.3-volt power signal.

Figure 4:
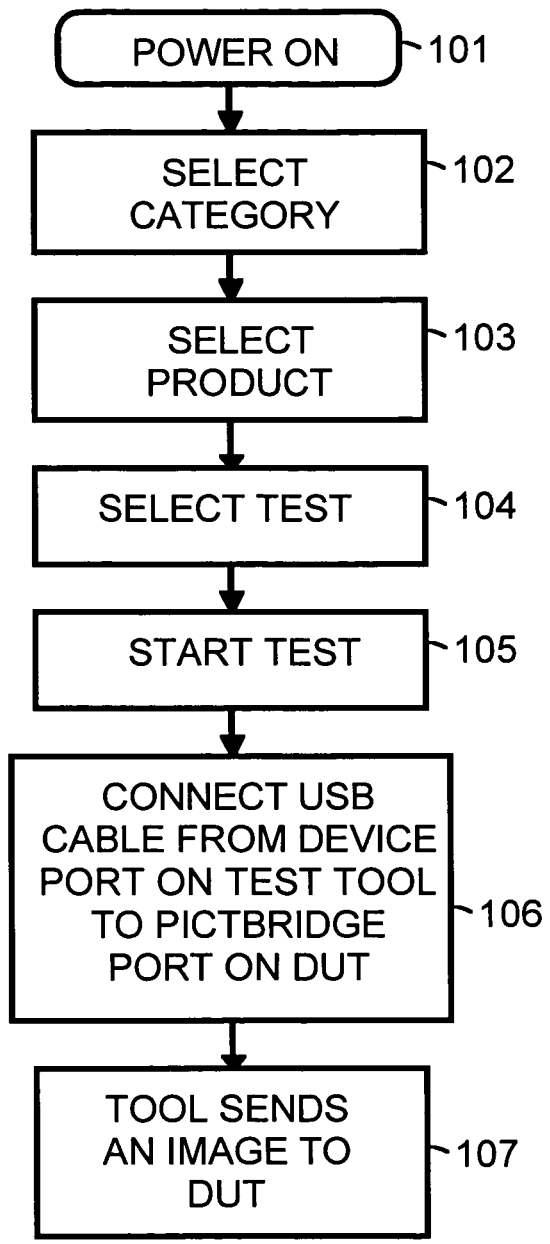
FIG. 4 is a simplified flow chart summarizing testing of a PictBridge port in accordance with an embodiment of the present invention.

FIG. 4 is a simplified flow chart summarizing testing of a PictBridge port of a DUT. For example, the DUT is a printer or some other device that can produce an output of an image. In a block 101, diagnostic tool 10 is powered on. In a block 103, product category is selected.

Figure 5:
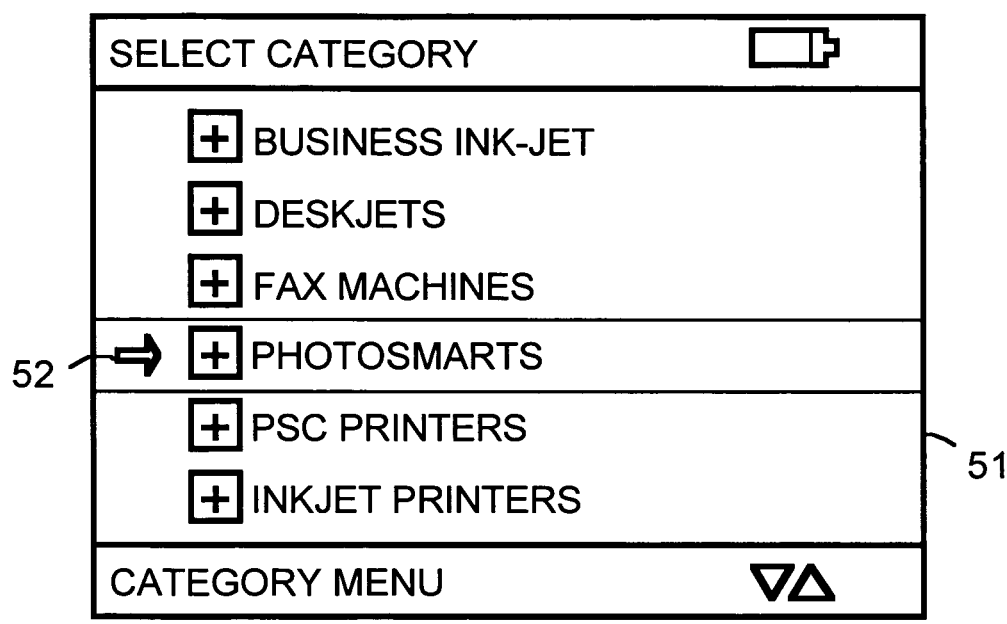
FIG. 5, FIG. 6, FIG. 7, FIG. 8, FIG. 9 and FIG. 10 show example simplified screens used during testing of a Pict-Bridge port in accordance with an embodiment of the present invention.

FIG. 5 shows a select category menu 51 as displayed on display 11. A user can use select category menu 51 to select a product category on which to perform tests. Location of a cursor 52 on select category menu 51 is controlled using direction key 16 and direction key 18 (shown in FIG. 1). In FIG. 5, "Photosmarts" is highlighted and can be selected by the user pressing selection key 15 (shown in FIG. 1). Photosmarts are a category of devices that include the ability to communicate using PictBridge. The other categories of devices listed include devices that do not have the ability to communicate using PictBridge.

Figure 6:
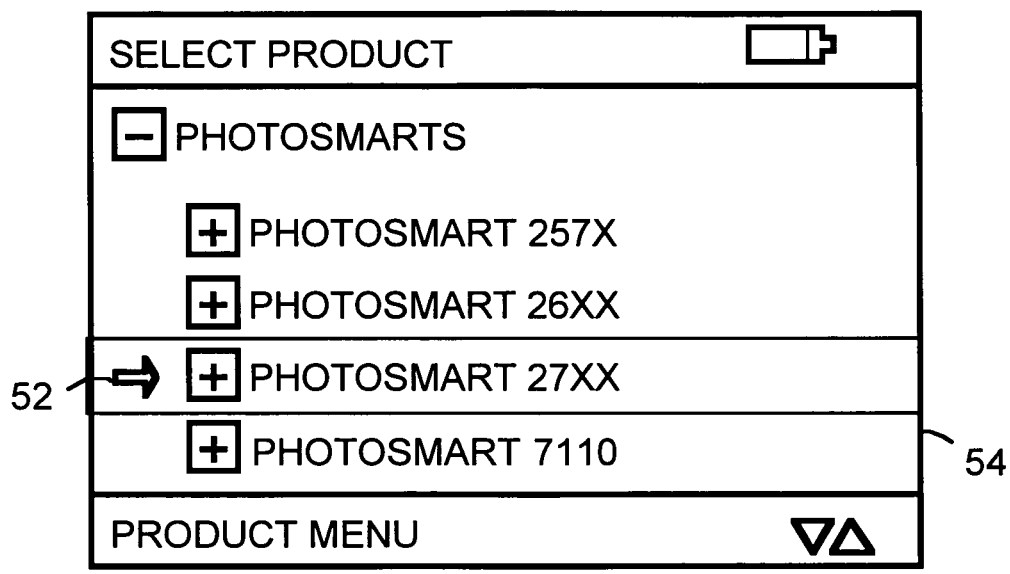

In a block 103 shown in FIG. 4, a product is selected. For example, FIG. 6 shows a select product menu 54 as displayed on display 11. The user can use select product menu 54 to select a product on which to perform tests. Location of cursor 52 on select product menu 54 is controlled using direction key 16 and direction key 18 (shown in FIG. 1). In FIG. 6, "Photosmart 27xx" is highlighted and can be selected by the user pressing selection key 15 (shown in FIG. 1).

Figure 7:
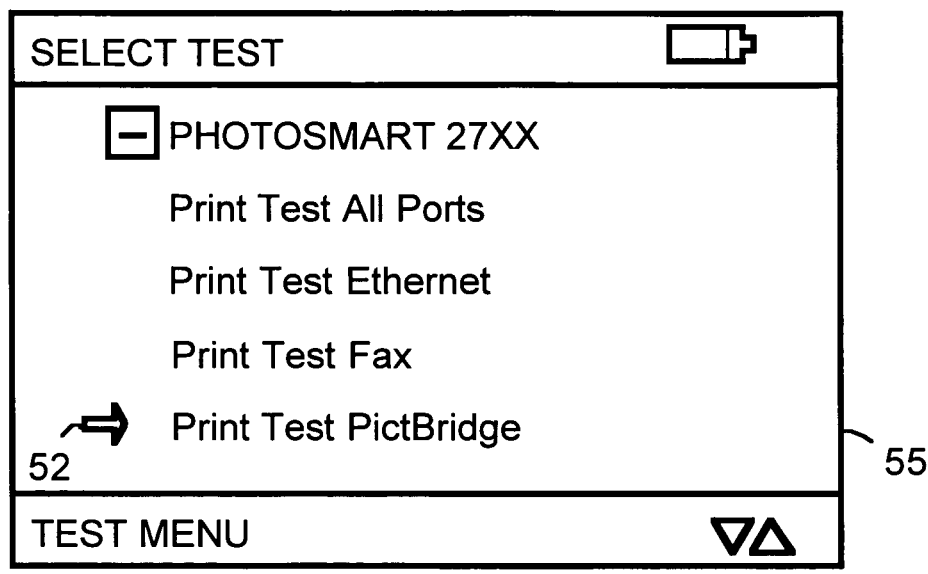

In a block 104 shown in FIG. 4, a test is selected. For example, FIG. 7 shows a select test menu 55 as displayed on display 11. The user can use select test menu 55 to select a test to be performed. Location of cursor 52 on select test menu 55 is controlled using direction key 16 and direction key 18 (shown in FIG. 1). In FIG. 7, "Print Test PictBridge" is highlighted and can be selected by the user pressing selection key 15 (shown in FIG. 1).

Figure 8:
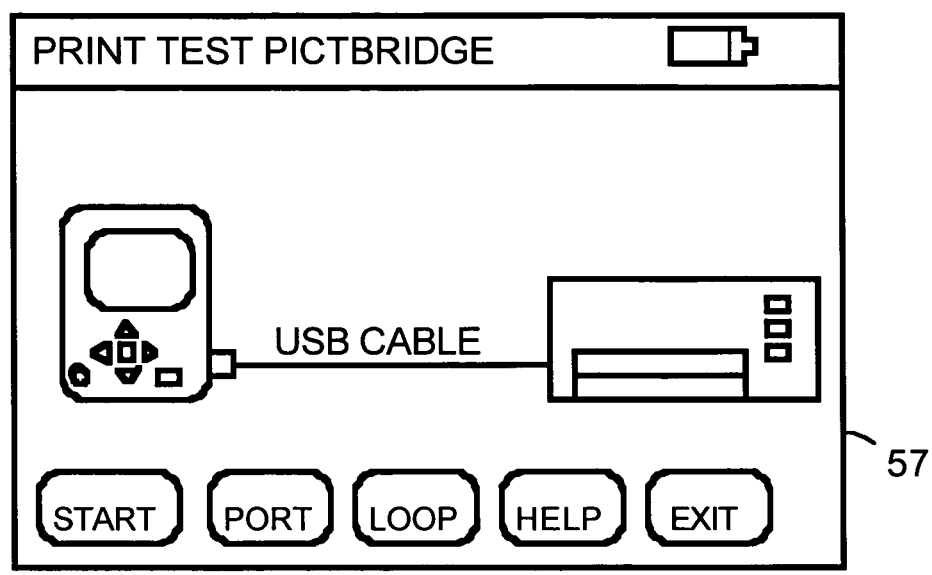

In a block 105 shown in FIG. 4, the test is started. For example, FIG. 8 shows a PictBridge test menu 57 as displayed on display 11 that shows a physical set-up for the Print Test PictBridge.

Figure 9:
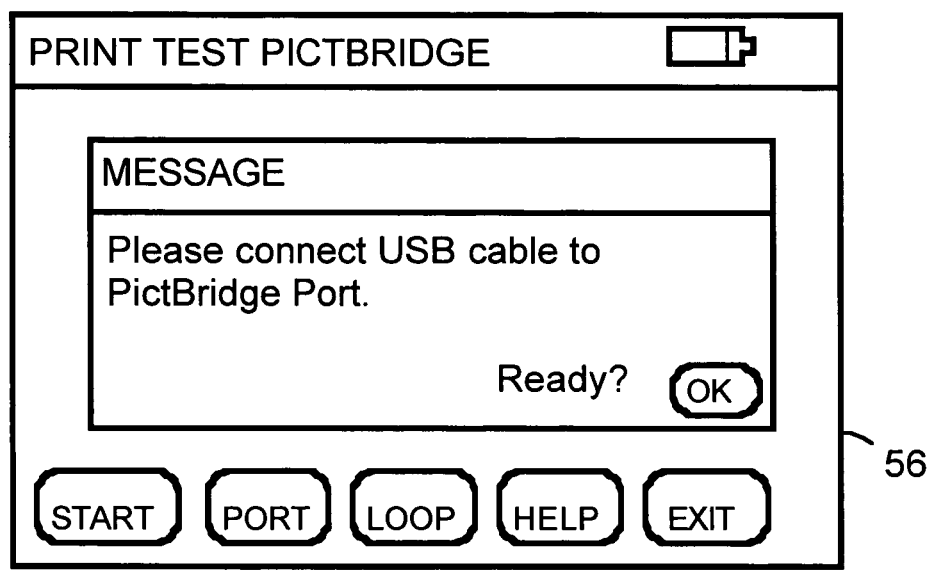

In a block 106 shown in FIG. 4, a USB cable is connected from USB device connector 37 (shown in FIG. 3) to a PictBridge port on the device under test. For example, FIG. 9 shows a PictBridge test menu 56 that displays a message to a user requesting connection of the USB cable to the PictBridge port.

Figure 10:
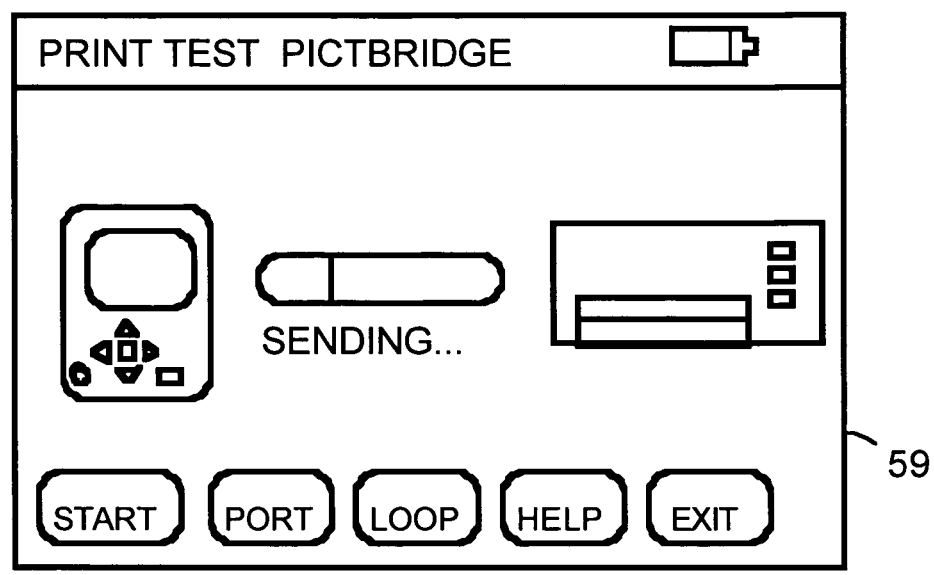

In a block 107 shown in FIG. 4, diagnostic tool 10 sends an image to the DUT over the USB cable. For example, the image is in the Joint Photograph Expert Group (JPEG) format or some other format supported by the DUT. For example, FIG. 10 shows a PictBridge test menu 59 as displayed on display 11 when a print test PictBridge is performed. The graphics give the user feedback on the progress of the PictBridge test.

Figure 11:
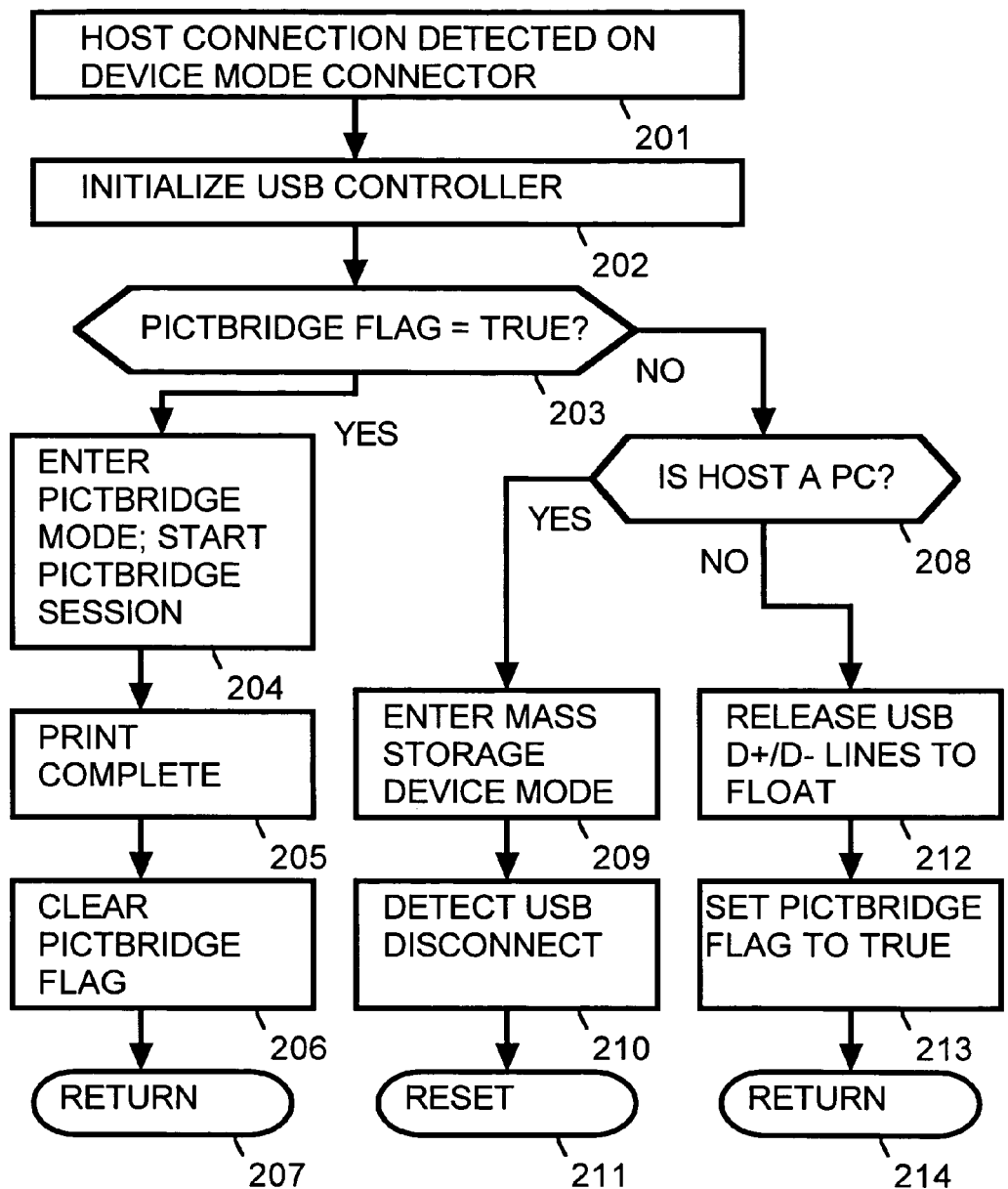
FIG. 11 is a simplified flow chart that illustrates automatic detection of a PictBridge port in accordance with an embodiment of the present invention.

FIG. 11 is a simplified flow chart that illustrates automatic detection of a PictBridge port. The flow chart allows a USB device when it is connected to a USB host to detect automatically whether the USB host expects to be connected to a PictBridge port or a storage device. The automatic detection is very useful for USB devices, such as digital cameras, that are treated as mass storage devices when connected to a personal computer, and are treated as a PictBridge devices when connected to a printer or other image output device. The automatic detection is also useful for diagnostic tool 10 to determine whether USB device connector 37 has been connected to a USB host, such as a PC, that expects diagnostic tool 10 to act as a mass storage device, or whether USB device connector 37 has been connected to a USB host, such as a printer, that expects diagnostic tool 10 to act as a PictBridge device.

In a block 201 a host connection is detected on a device mode connector (e.g., USB device connector 37, shown in FIG. 3) of a USB device. In a block 202, a USB controller (e.g., USB controller 35, shown in FIG. 3) is initialized. In a block 203, a check is made to see if a PictBridge Flag is set to true. If the PictBridge Flag is set to true, in a block 204, a PictBridge mode is entered and a PictBridge session is started. During the PictBridge session, the USB device (e.g., a camera or diagnostic tool 10) sends files, sends image data, controls USB host functions and reads USB host responses. For example, during a test of a printer, diagnostic tool 10 (acting as a USB device) sends a single JPEG image to be printed by the printer (acting as the USB host).

In a block 205, the print has been completed. In a block 206, the PictBridge Flag is cleared to be Not True. In a block 207, the process that automatically detects a PictBridge port returns.

After block 203, if the PictBridge flag does not equal True, in a block 208, a determination is made as to whether the USB host is a personal computer (PC) or some other USB host that is expecting to talk to a mass storage device. For example, the USB device responds to the USB host configuration requests with device descriptors of a mass storage device. If connected to a PC, for example, the PC recognizes the camera or diagnostic tool 10 as a mass storage device and selects the appropriate drivers for communication. This indicates to the camera or diagnostic tool 10 that the USB host is a PC or some other USB host that is expecting to talk to a mass storage device.

When the camera or diagnostic tool 10 responds to the USB host configuration requests with device descriptors of a mass storage device and the USB host does not recognize the device descriptors, this indicates to the camera or diagnostic tool 10 that the host is not a PC or some other USB host that is expecting to talk to a mass storage device.

If the USB host is a PC or some other USB host that is expecting to talk to a mass storage device, in a step 209, a mass storage device mode is entered. From this mode, the USB host can access storage within the USB device (e.g., a camera or diagnostic tool 10). In a block 210, a USB disconnect is detected. In a block 211, the USB device resets and returns.

If in block 208, it is determined that the USB host is not a PC or some other USB host that is expecting to talk to a mass storage device, in a block 212, the USB device causes the USB D+ and D− lines to float. This indicates to the USB host that the USB device is disconnected from the slave. A USB device, when connected to a USB host, is required (through two 15 kilohm resistors) to pull down the USB D+ and D− lines.

In a block 213, the PictBridge flag is set to true. In a block 214, the process that automatically detects a PictBridge port returns. When the USB device is ready to utilize the USB host, for example, when a camera or diagnostic tool 10 is ready to print using a printer, the USB device pulls down on the USB D+ and D− lines using the 15 kilohm resistors and block 201 is reentered with the PictBridge flag set to True.

Figure 12:
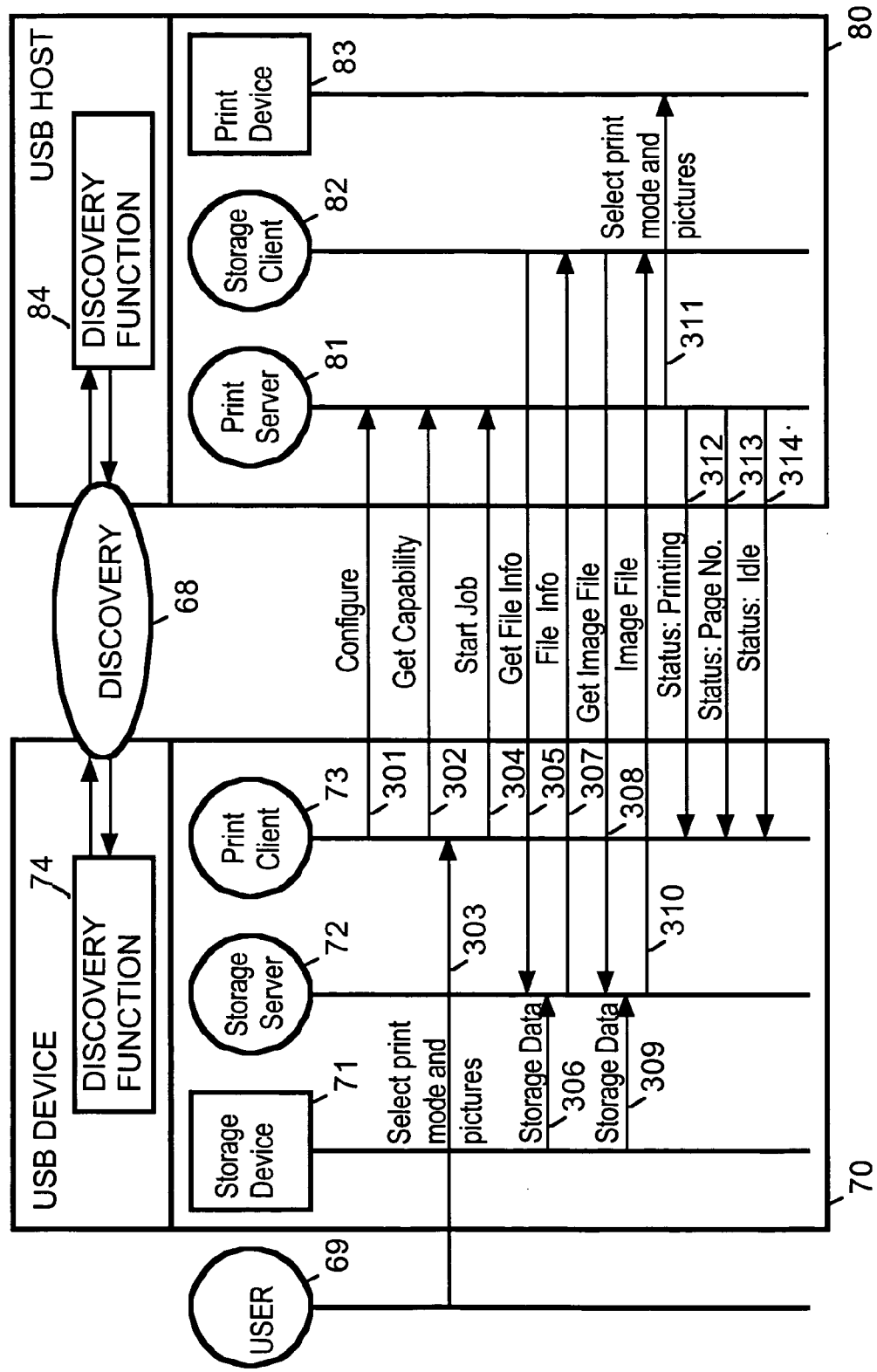
FIG. 12 shows job flow between PictBridge devices.

FIG. 12 shows a typical job flow between a USB device 70 and a USB host 80. For example, USB device 70 is a digital still camera or a diagnostic device, and USB host 80 is a printer. A discovery function 74 within USB device 70 and a discovery function 84 within USB host 80 through a discovery process 68 confirm that each device supports PictBridge. If PictBridge is available in each device, then control is transferred to Direct Print System (DPS) applications within the USB device and the USB host. The DPS applications within the USB device include a storage server function 72 and a print client function 73. The DPS applications within the USB host include a print server function 81 and a storage client function 82.

When the DPS applications start, a configure (DPS_ConfigurePrintService) operation 301 is issued. Configure operation 301 communicates which services each device provides. USB device 70 notifies USB host 80 that it has storage server function 72 and print client function 73. USB host 80 notifies USB device 70 that it has print server function 81 and the storage client function 82. Using this negotiation, connection is established between the server and the client for print and storage respectively. All DPS operations and events are executed between these client and server combinations. PictBridge defines a scenario where the user creates the intended print job on USB device 70 and then sends a print job to print server function 81, which then pulls the image files from storage server function 72 on USB device 70.

USB device 70 inquires about the capability of USB host 80 by issuing a get capability (DPS_GetCapability) operation 302. The capability returned from USB host 80 will direct the features displayed on USB device 70. A user 69 can then select the options they want from the features presented and initiate their print job.

When user 69 initiates a print, as represented by arrow 303, USB device 70 issues a start job (DPS_Startjob) operation 304. This sends USB host 80 the information it needs to print what user 69 requested.

When USB host 80 begins to process a job it first issues a get file info (DPS GetFileInfo) operation 305. This operation retrieves storage data 306 from storage device 71, which is forwarded to USB host 80 as file information 307 of the image file. File information 307 is used to get the actual image data by a get image file (DPS GetFile) operation 308. The image data is retrieved as storage data 309 from storage device 71 and image file 310 is transferred to USB host 80. Print server sends select print mode and pictures information 311 to a print device 83. Status sent from print server 81 to print client 73 include a printing status 312, a page number status 313 and an idle status 314. For additional information on a typical job flow between a USB device and a USB host, see the CIPA PictBridge (CIPA DC-001) standard.

In one embodiment of the invention, discovery function 74, storage server 72 During testing of USB host 80, diagnostic tool 10 acts as USB device 70.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A diagnostic tool comprising:
a USB device connector; and
a processor that allows a user to select a type of device to be tested, the processor having the ability to test PictBridge functionality of a USB host,
wherein the processor is to detect whether the USB host is expecting the diagnostic tool to be a storage device, and the processor is also to detect whether the USB host is expecting the diagnostic tool to be a PictBridge device,
wherein, to detect whether the USB host is expecting the diagnostic tool to be a PictBridge device, the processor is to:
receive a signal from the USB host when the USB host is connected to the USB device connector;
determine a value of a flag stored in the diagnostic tool in response to receiving the signal from the USB host; and
in response to a determination that the flag has a first value, cause the diagnostic tool to enter a first mode in which the diagnostic tool acts as a PictBridge device.

2. The diagnostic tool as in claim 1, additionally comprising:
a display on which the processor lists menus, the menus including a select product category menu.

3. The diagnostic tool as in claim 1, additionally comprising:
a display on which the processor lists menus, the menus including a select product menu.

4. The diagnostic tool as in claim 1, additionally comprising:
a display on which the processor lists menus, the menus including a select test menu.

5. The diagnostic tool as in claim 1, wherein when the USB host is expecting the diagnostic tool to be a storage device, the diagnostic tool connects to the USB host as a storage device and when the USB host is expecting the diagnostic tool to be a PictBridge device, the diagnostic tool connects to the USB host as a PictBridge device.

6. The diagnostic tool as in claim 1, further comprising:
in response to a determination that the flag has a second value, processor is to cause the diagnostic tool to enter a second mode in which the processor detects whether the USB host is expecting the diagnostic tool to be a storage device.

7. The diagnostic tool as in claim 6, wherein in response to a determination that the USB host is expecting the diagnostic tool to be a storage device, the diagnostic tool allows the USB host to access memory within the diagnostic tool.

8. The diagnostic tool as in claim 6 wherein in response to a determination that the USB host is not expecting the diagnostic tool to be a storage device, the processor causes D+ and D− USB lines to float and sets the flag to the first value.

9. A method by which a diagnostic tool responds to detecting connection of a USB host, the method comprising:
detecting, by the diagnostic tool from signals sent by the USB host, whether the USB host is expecting the diagnostic tool to be a storage device or a PictBridge device; and
connecting the diagnostic tool to the USB host so that the diagnostic tool acts as a storage device when the USB host is expecting the diagnostic tool to be a storage device and the diagnostic tool acts as a PictBridge device when the USB host is expecting the diagnostic tool to be a PictBridge device,
wherein detecting whether the USB host is expecting the diagnostic tool to be a PictBridge device includes:
determining a value of a flag stored in the diagnostic tool, and
in response to a determination that the flag has a first value, entering a first mode in which the diagnostic tool acts as a PictBridge device.

10. The method as in claim 9, further comprising:
in response to a determination that the flag has a second value, entering a second mode in which the diagnostic tool detects whether the USB host is expecting the diagnostic tool to be a storage device.

11. The method as in claim 10 additionally comprising the following:
allowing the USB host to access memory within the diagnostic tool when the diagnostic tool is in the second mode and the diagnostic tool detects that the USB host is expecting the diagnostic tool to be a storage device.

12. The method as in claim 10 additionally comprising the following:
allowing D+ and D− USB lines to float and setting the flag to the first value when the diagnostic tool is in the second mode and the diagnostic tool detects that the USB host is not expecting the diagnostic tool to be a storage device.

13. A diagnostic tool comprising:
a processor; and
a memory storing machine readable instructions, which when executed by the processor, cause the processor to:
connect a USB device connector of the diagnostic tool to a USB host;
provide, to a user, a list of devices that can be tested by the diagnostic tool, the list of devices including devices that do not have ability to communicate using PictBridge and devices that do have ability to communicate using PictBridge;
test a functionality of any devices from the list of devices selected by the user; and
control the diagnostic tool so that when the USB host is connected to the diagnostic tool, the diagnostic tool determines from signals sent by the USB host whether the USB host is expecting the diagnostic tool to be a storage device or a PictBridge device, wherein when the processor detects that a USB host is connected to the USB device connector and a flag stored in the diagnostic tool has a first value, the processor causes the diagnostic tool to enter a first mode in which the diagnostic tool acts as a PictBridge device.

14. The diagnostic tool as in claim 13, wherein to provide a list of devices that can be tested by the diagnostic tool, the processor causes the diagnostic tool to display menus, the menus including a select product category menu.

15. The diagnostic tool as in claim 13, wherein to provide a list of devices that can be tested by the diagnostic tool, the processor causes the diagnostic tool to display menus, the menus including a select product menu.

16. The diagnostic tool as in claim 13, wherein to provide a list of devices that can be tested by the diagnostic tool, the processor causes the diagnostic tool to display menus, the menus including a select test menu.

17. The diagnostic tool as in claim 13, wherein when the USB host is expecting the diagnostic tool to be a storage device, the diagnostic tool connects to the USB host as a storage device and when the USB host is expecting the diagnostic tool to be a PictBridge device, the diagnostic tool connects to the USB host as a PictBridge device.

18. The diagnostic tool as in claim 13, wherein when the processor detects that the USB host is connected to the USB device connector and the flag is a second value, the processor causes the diagnostic tool to enter a second mode in which the diagnostic tool detects whether the USB host is expecting the diagnostic tool to be a storage device.

* * * * *